(12) United States Patent
Yu et al.

(10) Patent No.: US 8,253,891 B2
(45) Date of Patent: Aug. 28, 2012

(54) THIN FILM TRANSISTOR SUBSTRATE AND LIQUID CRYSTAL DISPLAY INCLUDING THE SAME

(75) Inventors: Se-Hwan Yu, Asan-si (KR);
Hyang-Shik Kong, Seongnam-si (KR);
Jang-Soo Kim, Yongin-si (KR);
Byung-Duk Yang, Yongin-si (KR);
Kyoung-Tai Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 542 days.

(21) Appl. No.: 12/425,842

(22) Filed: Apr. 17, 2009

(65) Prior Publication Data

US 2010/0103354 A1 Apr. 29, 2010

(30) Foreign Application Priority Data

Oct. 28, 2008 (KR) .................. 10-2008-0105792

(51) Int. Cl.
*G02F 1/1335* (2006.01)
(52) U.S. Cl. .................................................. 349/106
(58) Field of Classification Search .................. None
See application file for complete search history.

(56) References Cited

U.S. PATENT DOCUMENTS

2005/0243235 A1* 11/2005 Lee ................................ 349/44

FOREIGN PATENT DOCUMENTS

| JP | 2004-295072 | 10/2004 |
|---|---|---|
| JP | 2006-227295 | 8/2006 |
| JP | 2007-212826 | 8/2007 |
| JP | 2008-026812 | 2/2008 |
| KR | 1020030037542 | 5/2003 |
| KR | 1020050003498 | 1/2005 |
| KR | 1020050051524 | 6/2005 |
| KR | 1020050096367 | 10/2005 |
| KR | 1020060043040 | 5/2006 |
| KR | 1020060086644 | 8/2006 |
| KR | 1020060130302 | 12/2006 |

* cited by examiner

*Primary Examiner* — Tina Wong
(74) *Attorney, Agent, or Firm* — F. Chau & Associates, LLC

(57) ABSTRACT

A thin film transistor array panel includes: a substrate, a plurality of gate and data lines, a thin film transistor, a light blocking member, a color filter, and a pixel electrode. The substrate includes a display area having a plurality of pixels and a non-display area. The gate lines and data lines are formed on the substrate. The thin film transistor is connected to a respective gate line and data line of the plurality of gate and data lines. The light blocking member is formed on the non-display area, the gate line, the data line, and the thin film transistor. The color filter is formed on the light blocking member. The pixel electrode is formed on the color filter. The color filter covers the entire light blocking member of the non-display area.

18 Claims, 5 Drawing Sheets

THIN FILM TRANSISTOR SUBSTRATE AND LIQUID CRYSTAL DISPLAY INCLUDING THE SAME

CROSS-REFERENCE TO RELATED APPLICATION

This application claims priority to Korean Patent Application No. 10-2008-0105792, filed in the Korean Intellectual Property Office on Oct. 28, 2008, the disclosure of which is incorporated by reference herein.

BACKGROUND OF THE INVENTION (a) Technical Field

The present disclosure relates to a thin film transistor array panel for a display device. More particularly, the present disclosure relates to a thin film transistor array panel including a color filter and a light blocking member, and a liquid crystal display including the same.

(b) Discussion of Related Art

Liquid crystal displays (LCDs) are one of the most widely used flat panel displays. An LCD may include a pair of display panels provided with field-generating electrodes, and a liquid crystal (LC) layer interposed between the two panels. The LCD displays images by applying voltages to the field-generating electrodes to generate an electric field in the LC layer that determines the orientations of LC molecules therein to adjust polarization of incident light.

A plurality of pixel electrodes and thin film transistors may be arranged in a matrix format on one display panel (hereinafter referred to as "a thin film transistor array panel"). Color filters of red, green, and blue may be formed on the other display panel. Further, one common electrode may cover the entire surface of the other display panel (hereinafter referred to as "a common electrode panel").

However, in this liquid crystal display, the pixel electrodes and the color filters are disposed on different display panels such that it may be difficult to align the pixel electrodes and the color filters with each other, thereby generating an alignment error.

The color filter and a black matrix (e.g., referred to as a light blocking member) may instead be formed on the same display panel as the pixel electrode.

However, ions or impurities due to the black matrix may adversely influence liquid crystal of the display, thereby generating afterimages. Thus, there is a need for an LCD having a light blocking member included with pixel electrodes on a same display panel, which has less of an adverse affect on liquid crystal of the display.

SUMMARY OF THE INVENTION

A thin film transistor array panel according to an exemplary embodiment of the present invention includes: a substrate, a plurality of gate and data lines, a thin film transistor, a light blocking member, a color filter, and a pixel electrode. The substrate includes a display area having a plurality of pixels and a non-display area. The gate and data lines are formed on the substrate. The thin film transistor is connected to a respective gate line and data line of the plurality of gate and data lines. The light blocking member is formed on the non-display area, the gate line, the data line, and the thin film transistor. The color filter is formed on the light blocking member. The pixel electrode is formed on the color filter. The color filter covers the entire light blocking member of the non-display area.

The thin film transistor array panel may further include a passivation layer formed between the color filter and the pixel electrode. The thin film transistor array panel may further include a first spacer formed in the display area and a second spacer formed in the non-display area. The first spacer and the second spacer may have different heights.

The color filter and the light blocking member may be disposed under the second spacer. The color filter covering the entire light blocking member of the non-display area may be a blue color filter.

The thin film transistor array panel may further include a passivation layer formed between the light blocking member and the color filter.

A liquid crystal display according to an exemplary embodiment of the present invention includes: a first substrate, a plurality of gate and data lines, a thin film transistor, a light blocking member, a color filter, a pixel electrode, and a second substrate. The first substrate includes a display area and a non-display area. The gate and data lines are formed on the first substrate. The thin film transistor is connected to a respective gate line and data line of the plurality of gate and data lines. The light blocking member is formed on the non-display area, the gate line, the data line, and the thin film transistor. The color filter is formed on the light blocking member. The pixel electrode is formed on the color filter and includes a plurality of branches. The second substrate faces the first substrate and includes a common electrode.

The liquid crystal display may further include a passivation layer formed between the color filter and the pixel electrode. The liquid crystal display may further include a first spacer formed in the display area and a second spacer formed in the non-display area. The first spacer and the second spacer may have different heights. The height of the first spacer may be greater than that of the second spacer.

The color filter and the light blocking member may be disposed under the second spacer. The color filter may cover the entire light blocking member of the non-display area. The color filter covering the entire light blocking member of the non-display area may be a blue color filter. The color filter may include a plurality of color filters. Each of the color filters may overlap each other on the light blocking member on the data line between the pixels. The pixel electrode may be connected to the thin film transistor through a contact hole of the color filter and the passivation layer.

DETAILED DESCRIPTION OF EXEMPLARY EMBODIMENTS

Figure 1:
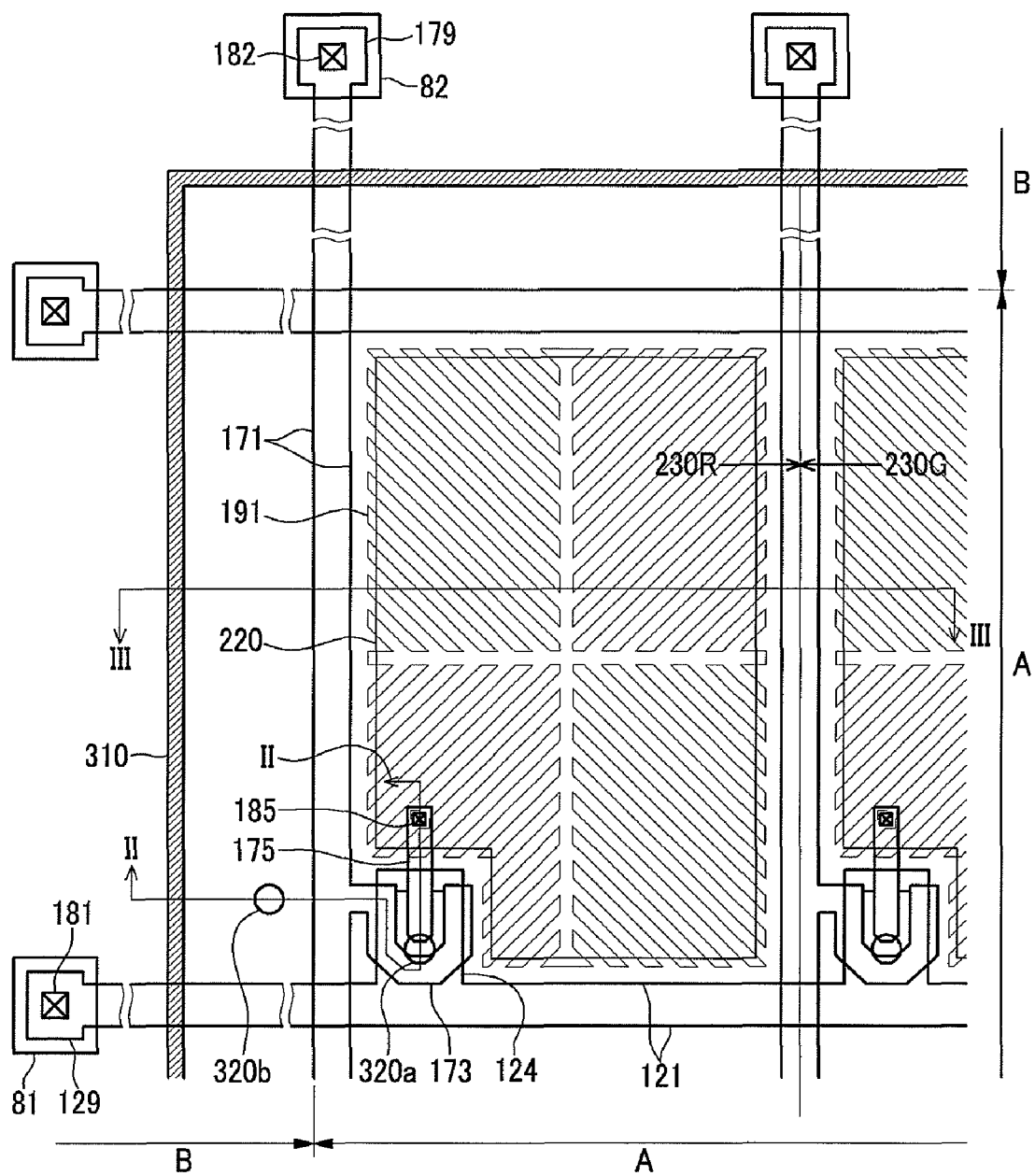
FIG. 1 is a layout view of a liquid crystal display according to an exemplary embodiment of the present invention.

Hereinafter, exemplary embodiments of the present invention will be described more fully with reference to the accompanying drawings.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

A liquid crystal display according to an exemplary embodiment of the present invention will be described in detail with reference to FIG. 1 to FIG. 3.

Figure 2:
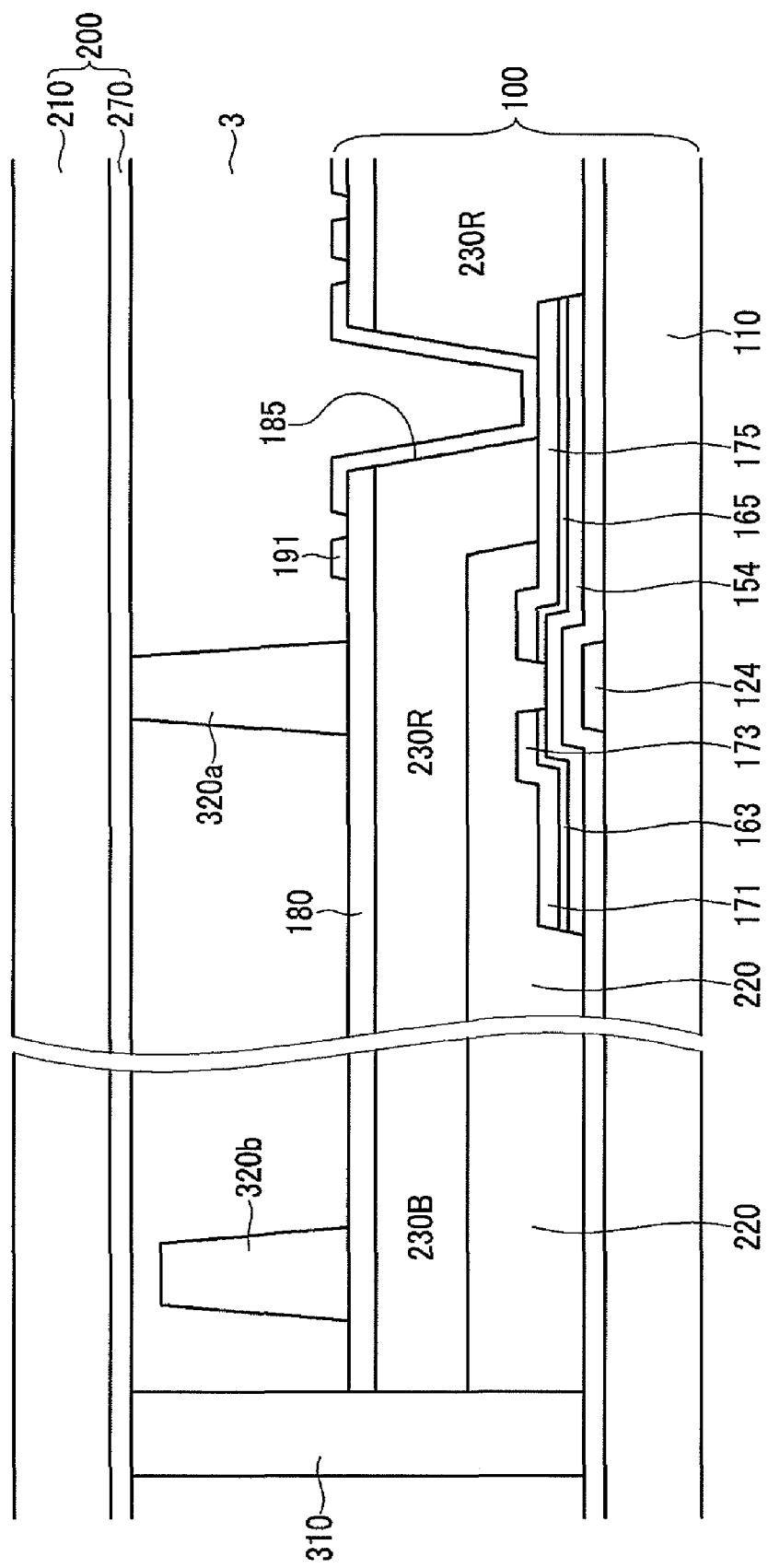
FIG. 2 is a cross-sectional view of the liquid crystal display shown in FIG. 1 taken along the line II-II.
Figure 3:
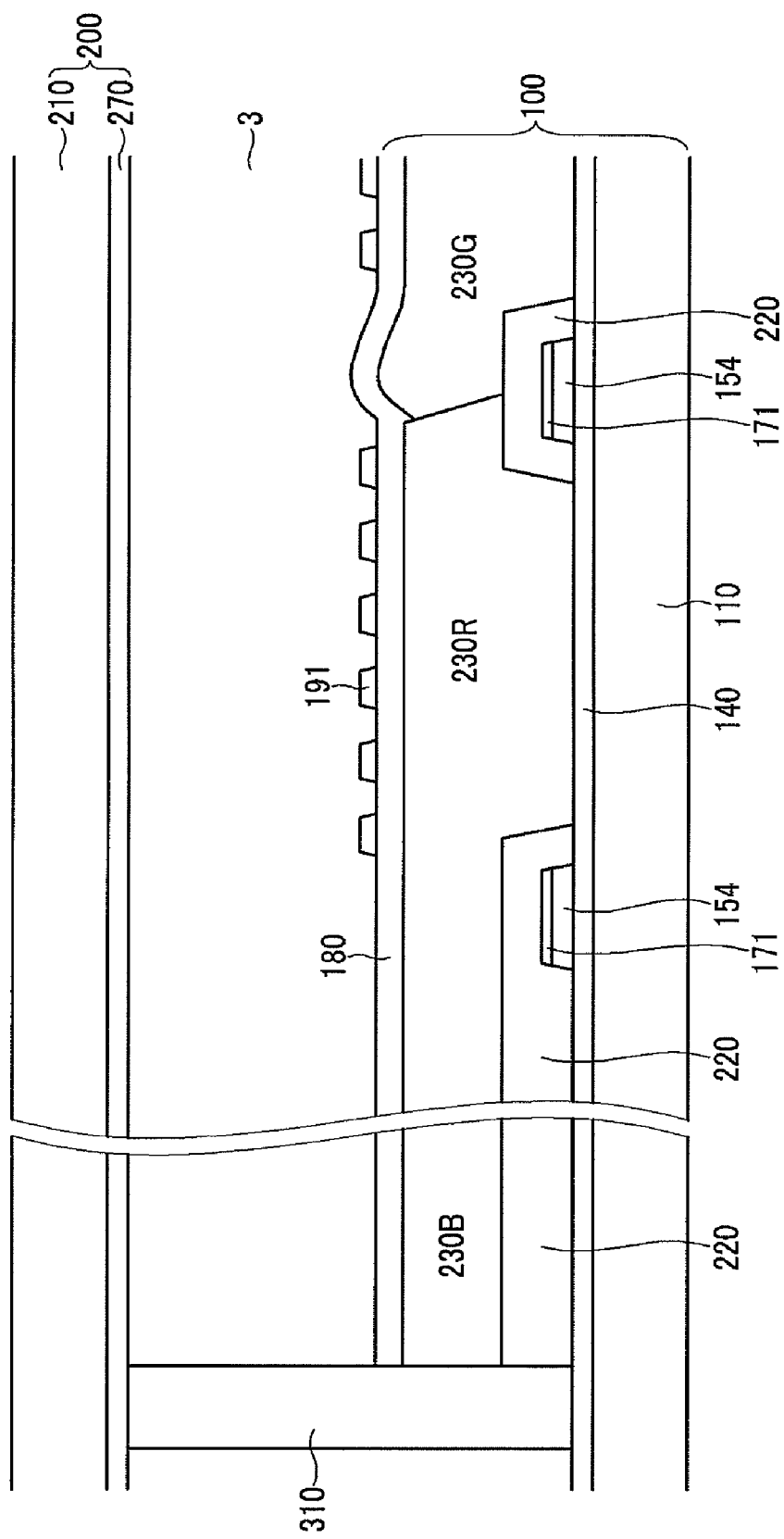
FIG. 3 a cross-sectional view of the liquid crystal display shown in FIG. 1 taken along the line III-III.

FIG. 1 is a layout view of a liquid crystal display according to an exemplary embodiment of the present invention, FIG. 2 is a cross-sectional view of the liquid crystal display shown in FIG. 1 taken along the line II-II, and FIG. 3 a cross-sectional view of the liquid crystal display shown in FIG. 1 taken along the line III-III.

Referring to FIG. 1 to FIG. 3, the liquid crystal display according to an exemplary embodiment of the present invention includes a thin film transistor array panel 100 and a common electrode panel 200 facing each other, and a liquid crystal layer 3 disposed therebetween. The two display panels 100 and 200 are combined by a sealant 310, and include a display area A and a non-display area B.

A plurality of gate lines 121 including gate electrodes 124 are formed on an insulating substrate 110 made of a material such as transparent glass or plastic, and a gate insulating layer 140, a plurality of semiconductors 154, a plurality of ohmic contacts 163 and 165, a plurality of data lines 171, and a plurality of drain electrodes 175 are sequentially formed thereon.

The gate lines 121 transmit gate signals and extend in a transverse direction. Each of the gate lines 121 includes an end portion 129 having a wide area for connection with an external circuit formed in the non-display area B.

The data lines 171 transmit data voltages and extend in a longitudinal direction, thereby intersecting the gate lines 121. Each data line 171 includes a plurality of source electrodes 173 extending toward the gate electrodes 124 and an end portion 179 having a wide area for connection with an external circuit formed in the non-display area B. The drain electrodes 175 are separated from the data lines 171 and are opposite to the source electrodes 173 with respect to the gate electrodes 124.

The semiconductors 154 are disposed on the gate electrodes 124, and the ohmic contacts 163 and 165 thereon are only disposed between the semiconductors 154, and the data lines 171 and drain electrodes 175, and reduce the contact resistance therebetween.

A gate electrode 124, a source electrode 173, and a drain electrode 175 form a thin film transistor (TFT) along with a semiconductor 154, and the channel of the thin film transistor is formed in the semiconductor 154 between the source electrode 173 and the drain electrode 175.

A light blocking member 220 that may be referred to as a black matrix is formed on the gate line 121, the data line 171, and the thin film transistor. The light blocking member 220 is also formed on the non-display area B.

Color filters 230R, 230G, and 230B are formed on the light blocking member 220. The color filters 230R, 230G, and 230B are overlapped on the light blocking member 220 on the data lines 171 disposed between the pixels. At least one of the red color filter 230R, the green color filter 230G, and the blue color filter 230B may be formed on the light blocking member 220 of the non-display area B. According to an embodiment, the blue color filter 230B is formed on the light blocking member 220 of the non-display area B. The light blocking member 220 of the non-display area B may be entirely covered by the color filters 230R, 230G, and 230B.

A passivation layer 180 is formed on the color filters 230R, 230G, and 230B. The passivation layer 180 and the color filters 230R, 230G, and 230B have contact holes 185 exposing the drain electrodes 175. The passivation layer 180 and the color filters 230R, 230G, and 230B also have contact holes 181 and 182 exposing the end portions 129 and 179 of the data lines 171 and the gate lines 121. A plurality of pixel electrodes 191 and a plurality of contact assistants 81 and 82 are formed on the passivation layer 180.

The pixel electrodes 191 are connected to the drain electrodes 175 of the thin film transistors through the contact holes 185, and are applied with data voltages from the drain electrodes 175. The shape of the pixel electrodes 191 may be a quadrangle. For example the shape of the pixel electrodes 191 may include a cross-shaped stem having a transverse stem and a longitudinal stem that cross each other. Each pixel electrode 191 may be divided into four sub-regions by the transverse stem and the longitudinal stem. Each of the sub-regions may include a plurality of first to fourth branches. The lengths of the branches may be minute or small as compared to the stems.

Each of the branches may form an angle of about 45 degrees or 135 degrees with the gate lines 121 or the transverse stem. The branches of two neighboring sub-regions may also be crossed. Although not shown, the widths of the branches may become wider closer to the transverse stem or the longitudinal stem.

The contact assistants 81 and 82 are respectively connected to the end portions 129 and 179 of the gate lines 121 and the data lines 171 through the contact holes 181 and 182. The contact assistants 81 and 82 may enhance the adhesion force between the end portions 129 and 179 and external devices such as a driver IC, and may protect them.

The color filters 230R, 230G, and 230B may be disposed on the light blocking member 220 such that influence of the ions and impurities of the light blocking member 220 to the liquid crystal layer 3 may be reduced or prevented. The color filters 230R, 230G, and 230B may be disposed on the light blocking member 220 of the non-display area B such that the effect of reducing or preventing light leakage may be improved.

The common electrode panel 200 faces the thin film transistor array panel 100, and includes a substrate 210 and a common electrode 270 formed thereon. However, the common electrode 270 may be formed on the thin film transistor array panel 100. The liquid crystal layer 3 is disposed between the common electrode panel 200 and the thin film transistor array panel 100. A first spacer 320a and a second spacer 320b are formed between the common electrode panel 200 and the thin film transistor array panel 100. The first spacer 320a is disposed in the display area A, and the second spacer 320b is disposed in the non-display area B.

The first spacer 320a and the second spacer 320b may have different lengths. The first spacer 320a contacts the common electrode panel 200, and maintains a uniform interval between the thin film transistor array panel 100 and the common electrode panel 200. The first spacer 320a may be elastic such that it may be compressed and returned to an original state.

The second spacer 320b is separated from the common electrode panel 200, and contacts the common electrode panel 200 when an external force of more than a predetermined value is applied to the first spacer 320a such that the external force applied to the first spacer 320a is dispersed. Accordingly, damage to the first spacer 320a by the external force may be reduced or prevented.

The color filters 230R, 230G, and 230B and the light blocking member 220 are disposed under the second spacer 320b such that the height of the bottom surface of the second spacer 320b may be the same as the height of the bottom surface of the first spacer 320a.

The first spacer 320a and the second spacer 320b may be formed with the different lengths using, for example, a half-tone exposure method. For example, when the exposure process is executed to form the first spacer 320a and the second spacer 320b, an exposure mask including a transmission region, a semi-transparent region, and a light blocking region may be used, wherein a portion corresponding to the first spacer 320a is aligned to the transmission region, a portion corresponding to the second spacer 320b is aligned to the semi-transparent region such as slits, and the remaining portion is aligned to the light blocking region, and thereby the first spacer 320a and the second spacer 320b may have the different lengths.

When both the first spacer 320a and the second spacer 320b have the different heights from the surface, the margin of the liquid crystal may be increased. An active unfilled area (AUA) deterioration where the liquid crystal is not sufficient on some portion such that light leakage is generated may be reduced or prevented. Further, a deterioration due to gravity in which the liquid crystal is excessively filled may be reduced or prevented.

Figure 4:
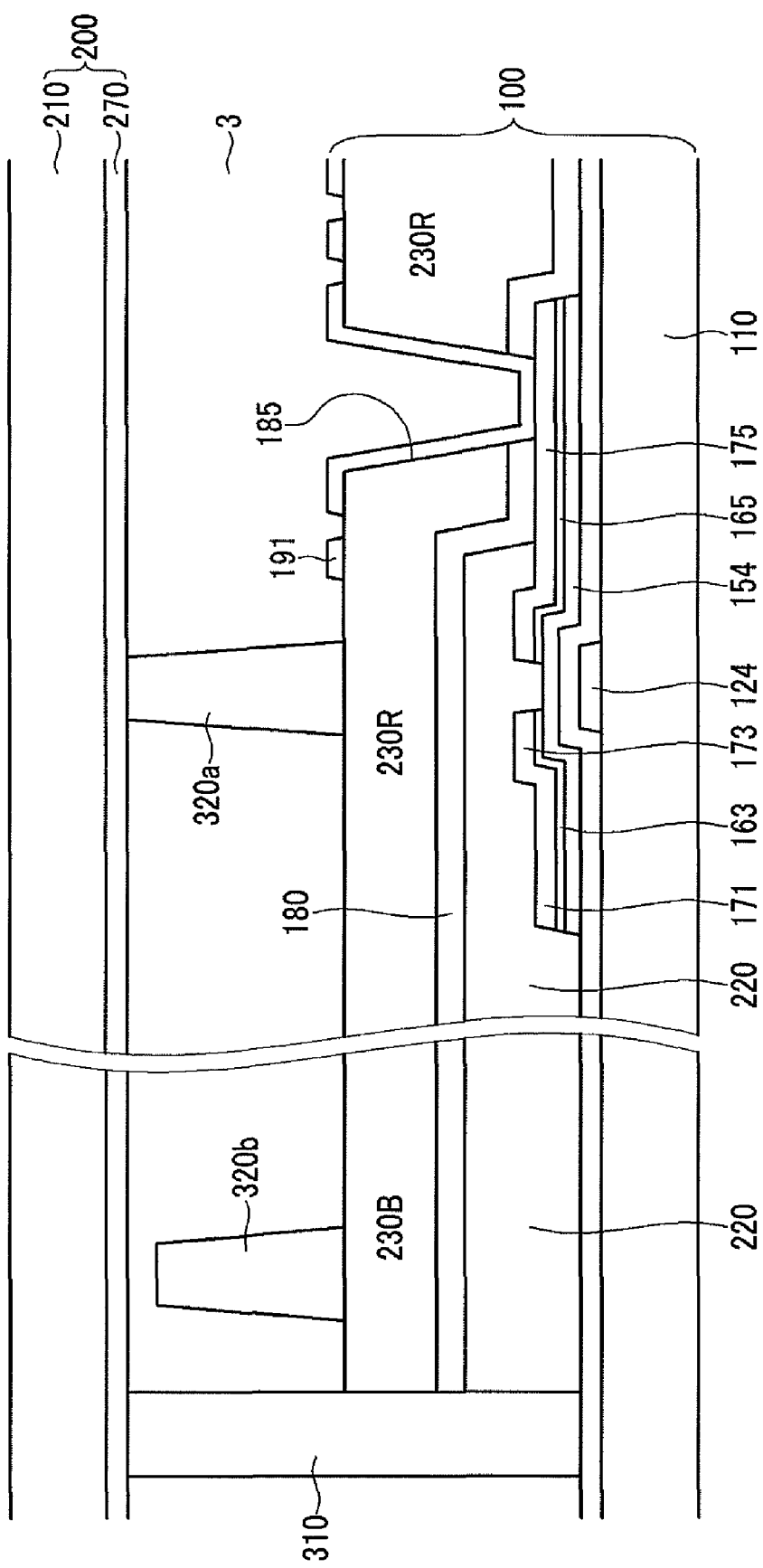
FIG. 4 and FIG. 5 are cross-sectional views of a liquid crystal display according to an exemplary embodiment of the present invention.
Figure 5:
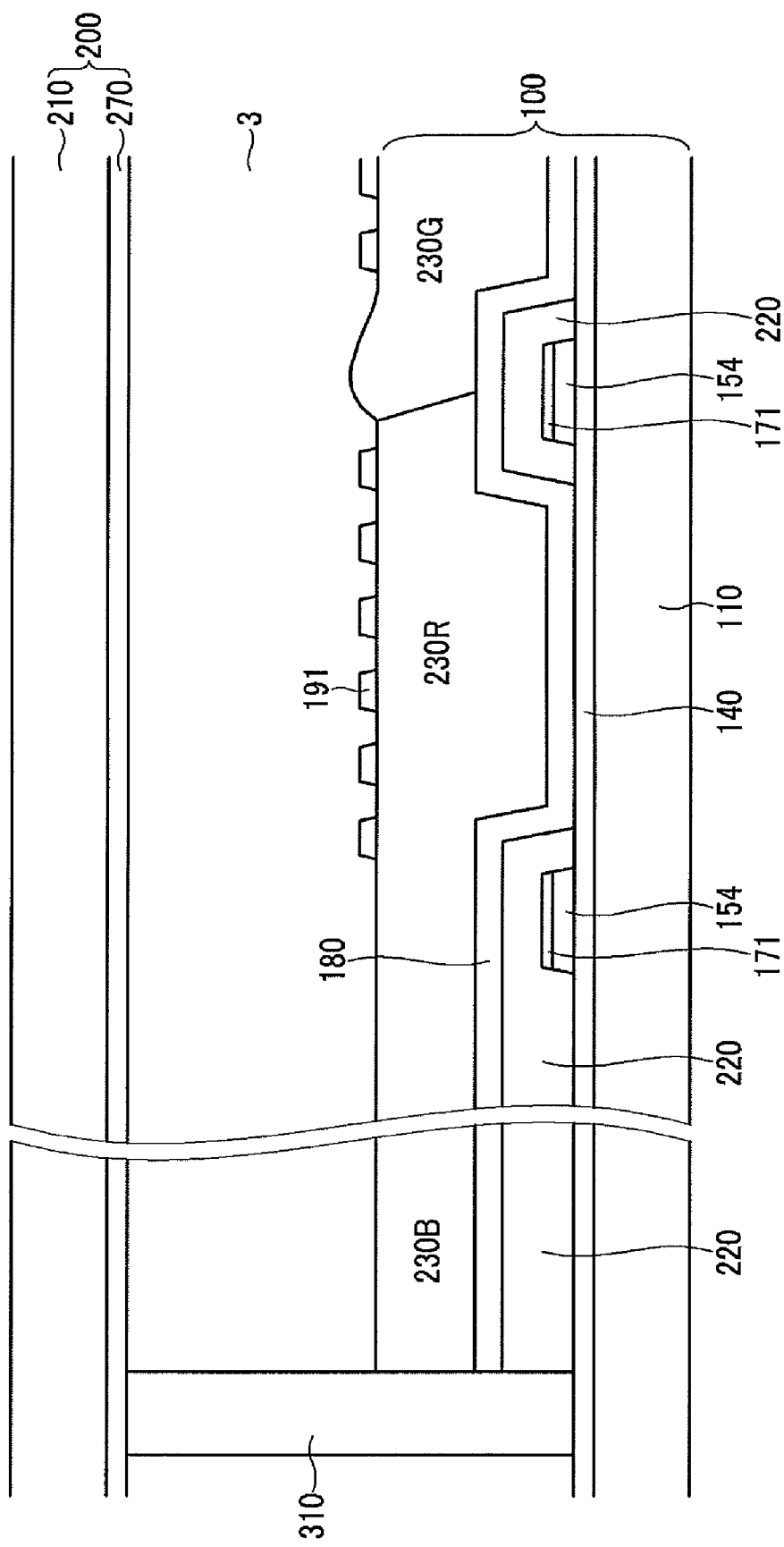

FIG. 4 and FIG. 5 are cross-sectional views of a liquid crystal display according to an exemplary embodiment of the present invention.

As shown in FIG. 4 and FIG. 5, the liquid crystal display is similar to that of the exemplary embodiment shown in FIG. 1 through FIG. 3. However the position of the passivation layer 180 and the color filters 230R, 230G, and 230B differ from the exemplary embodiment shown in FIG. 1 through FIG. 3.

For example, a light blocking member 220, which may be referred to as a black matrix is formed on a gate line 121, a data line 171, and a thin film transistor, and a light blocking member 220 is also formed in the non-display area B.

A passivation layer 180 is formed on the light blocking member 220. Color filters 230R, 230G, and 230B are formed on the passivation layer 180. The color filters 230R, 230G, and 230B are overlapped with each other on the light blocking member 220 on the data line 171 between the pixels. At least one of the red color filter 230R, the green color filter 230G, and the blue color filter 230B may be formed on the light blocking member 220 of the non-display area B. According to an embodiment, the blue color filter 230B is formed on the light blocking member 220 of the non-display area B. All of the light blocking members 220 of the non-display area B may be covered by the color filters 230R, 230G, and 230B.

The passivation layer 180 and the color filters 230R, 230G, and 230B have a contact hole 185 exposing the drain electrodes 175. The passivation layer 180 and the color filters 230R, 230G, and 230B also have contact holes 181 and 182 exposing the end portions 129 and 179 of the data lines 171 and the gate lines 121.

Having described exemplary embodiments of the invention, it is to be understood that the invention is not limited to the disclosed embodiments, and is intended to cover various modifications and equivalent arrangements included within the spirit and scope of the disclosure.

What is claimed is:

1. A thin film transistor array panel comprising:
   a substrate including a display area having a plurality of pixels and a non-display area that is distinct from the display area;
   a plurality of gate and data lines disposed on the substrate;
   a thin film transistor connected to a respective gate line and data line of the plurality of gate and data lines;
   a continuous light blocking member disposed within both the display area and the non-display area, and disposed on the gate line, the data line, and the thin film transistor;
   a color filter located on the light blocking member; and
   a pixel electrode located on the color filter,
   wherein the color filter covers the entire light blocking member of the non-display area.

2. The thin film transistor array panel of claim 1, further comprising a passivation layer located between the color filter and the pixel electrode.

3. The thin film transistor array panel of claim 2, further comprising a first spacer located in the display area and a second spacer in the non-display area.

4. The thin film transistor array panel of claim 3, wherein a height of the first spacer differs from a height of the second spacer.

5. The thin film transistor array panel of claim 4, wherein the color filter and the light blocking member are disposed under the second spacer.

6. The thin film transistor array panel of claim 5, wherein the color filter covering the entire light blocking member of the non-display area is a blue color filter.

7. The thin film transistor array panel of claim 1, further comprising a passivation layer disposed between the light blocking member and the color filter.

8. A liquid crystal display comprising:
   a first substrate including a display area having a plurality of pixels and a non-display area;
   a plurality of gate and data lines disposed on the first substrate;
   a thin film transistor connected to a respective gate line and data line of the plurality of gate and data lines;
   a continuous light blocking member disposed within both the display area and the non-display area, and disposed on the gate line, the data line, and the thin film transistor;
   a color filter disposed on the light blocking member;
   a pixel electrode disposed on the color filter, wherein the pixel electrode has a plurality of branches; and
   a second substrate facing the first substrate and including a common electrode,
   wherein the color filter covers the entire light blocking member of the non-display area.

9. The liquid crystal display of claim 8, further comprising a passivation layer disposed between the color filter and the pixel electrode.

10. The liquid crystal display of claim 9, further comprising a first spacer disposed in the display area and a second spacer disposed in the non-display area.

11. The liquid crystal display of claim 10, wherein a height of the first spacer differs from a height of the second spacer.

12. The liquid crystal display of claim 11, wherein the height of the first spacer is greater than that of the second spacer.

13. The liquid crystal display of claim 12, wherein the color filter and the light blocking member are disposed under the second spacer.

14. The liquid crystal display of claim 8, wherein the color filter covering the entire light blocking member of the non-display area is a blue color filter.

15. The liquid crystal display of claim 14, wherein the color filter includes a plurality of color filters that overlap each other on the light blocking member on the data lines between the pixels.

16. The liquid crystal display of claim 15, wherein the pixel electrode is connected to the thin film transistor through a contact hole of the color filter and the passivation layer.

17. The liquid crystal display of claim 8, further comprising a passivation layer disposed between the light blocking member and the color filter.

18. A thin film transistor array panel comprising:
a substrate including a display area having a plurality of pixels and a non-display area that is distinct from the display area;
a plurality of gate and data lines disposed on the substrate;
a thin film transistor connected to a respective gate line and data line of the plurality of gate and data lines;
a continuous light blocking member disposed within both the display area and the non-display area, and disposed on the gate line, the data line, and the thin film transistor;
a color filter located on the light blocking member;
a passivation layer located between the color filter and the pixel electrode;
a first spacer located in the display area and a second spacer in the non-display area; and
a pixel electrode located on the color filter,
wherein the color filter covers the entire light blocking member of the non-display area, and
wherein a height of the first spacer differs from a height of the second spacer.

* * * * *